United States Patent
Qiu et al.

(10) Patent No.: US 10,386,482 B2
(45) Date of Patent: Aug. 20, 2019

(54) DEVICE-FREE TRACKING SYSTEM THAT ACCURATELY TRACKS HAND MOVEMENT

(71) Applicant: Board of Regents, The University of Texas System, Austin, TX (US)

(72) Inventors: Lili Qiu, Austin, TX (US); Sangki Yun, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 312 days.

(21) Appl. No.: 15/414,084

(22) Filed: Jan. 24, 2017

(65) Prior Publication Data

US 2017/0212235 A1    Jul. 27, 2017

Related U.S. Application Data

(60) Provisional application No. 62/286,521, filed on Jan. 25, 2016.

(51) Int. Cl.
*G01S 15/62* (2006.01)
*G01S 15/42* (2006.01)
*G01S 15/58* (2006.01)

(52) U.S. Cl.
CPC .............. *G01S 15/62* (2013.01); *G01S 15/42* (2013.01); *G01S 15/582* (2013.01)

(58) Field of Classification Search
CPC ......... G01S 15/62; G01S 15/42; G01S 15/582
See application file for complete search history.

(56) References Cited

U.S. PATENT DOCUMENTS 3,427,617 A * 2/1969 Richman ................. G01S 7/36
                                                                    342/111
6,002,808 A   12/1999 Freeman
(Continued)

FOREIGN PATENT DOCUMENTS

WO   WO-2018106872 A1 * 6/2018 ............... G06F 3/01

OTHER PUBLICATIONS

Yun et al., "Turning a Mobile Device into a Mouse in the Air," The 13th International Conference on Mobile Systems, Applications, and Services, Florence, Italy, May 18-22, 2015, pp. 1-15.
(Continued)

*Primary Examiner* — Daniel Pihulic
(74) *Attorney, Agent, or Firm* — Robert A. Voigt, Jr.; Winstead, P.C.

(57) ABSTRACT

A method, system and computer program product for tracking movement of an object, such as a hand. Speakers of a device to be controlled transmit frequency modulated continuous wave (FMCW) audio signals. These signals are reflected by the object and received by the microphones at the controlled device. The received and transmitted audio signals are mixed. A fast Fourier transform (FFT) is then performed on the mixed audio signals. One or more peak frequencies in the frequency domain of the FFT mixed audio signals are selected and used to estimate the distance between the object and the speakers of the controlled device. Furthermore, the velocity of the object is estimated. The coordinates of the object are then computed using the estimated distance between the object and the speakers and microphones of the controlled device and the estimated velocity of the object.

38 Claims, 9 Drawing Sheets

(56) References Cited

U.S. PATENT DOCUMENTS

| | | | |
|---|---|---|---|
| 6,236,736 B1 | 5/2001 | Crabtree et al. | |
| 6,918,875 B2 * | 7/2005 | Moriya | G01S 15/8954 367/101 |
| 8,938,124 B2 | 1/2015 | Eilat et al. | |
| 9,170,325 B2 * | 10/2015 | Zhang | G01S 11/14 |
| 10,182,414 B2 * | 1/2019 | Qiu | H04W 48/16 |
| 2012/0327125 A1 | 12/2012 | Kutliroff et al. | |
| 2016/0063611 A1 * | 3/2016 | Davis | G06F 16/532 705/26.63 |
| 2016/0321917 A1 * | 11/2016 | Qiu | G08C 23/02 |
| 2017/0164321 A1 * | 6/2017 | Qiu | H04W 48/16 |
| 2017/0212235 A1 * | 7/2017 | Qiu | G01S 15/62 |
| 2017/0347951 A1 * | 12/2017 | Gollakota | A61B 5/0816 |
| 2018/0164874 A1 * | 6/2018 | Qiu | G06F 3/01 |

OTHER PUBLICATIONS

Nandakumar et al., "Contactless Sleep Apnea Detection on Smartphones," The 13th International Conference on Mobile Systems, Applications, and Services, Florence, Italy, May 18-22, 2015, pp. 1-13.

\* cited by examiner

BEFORE IGNORING THE SPECTRAL POINTS

AFTER IGNORING THE SPECTRAL POINTS

DEVICE-FREE TRACKING SYSTEM THAT ACCURATELY TRACKS HAND MOVEMENT

TECHNICAL FIELD

The present invention relates generally to controlling devices, and more particularly to a device-free tracking system that accurately tracks hand movement thereby enabling the control of the device by hand movement.

BACKGROUND

Smart TVs, smart appliances, Virtual Reality (VR), and Augmented Reality (AR) are all becoming increasingly popular. The key to their success is having an easy-to-use user interface to control the device (e.g., smart TVs, smart appliances and devices implementing VR/AR). Currently though such devices lack an easy-to-use user interface.

Smart TVs are currently cumbersome to control by having the user navigate through various menus. Many smart appliances require users to manually launch smartphone applications and click through pages to control the smart appliance, which is even more cumbersome than turning on/off switches. VR and AR provide an immersive experience, and open the doors to new ways of training, education, meeting, advertising, travel, health care, emergency responses, and scientific experiments. However, the current user interface of devices implementing VR/AR are rather limited: they rely on tapping, swiping, voice recognition, or steering the camera towards the hand to make sure the hand is within the view and line-of-sight of the camera while wearing the headset.

Hence, there is not currently a means for easily interacting and controlling devices, such as smart devices and device implementing VR/AR.

SUMMARY

In one embodiment of the present invention, a method for tracking movement of an object comprises transmitting audio signals from one or more speakers to the object. The method further comprises receiving samples of the audio signals reflected from the object over a period of time. The method additionally comprises mixing the received audio signals with the transmitted audio signals. Furthermore, the method comprises performing, by a processor, a fast Fourier transform on the mixed audio signals. Additionally, the method comprises selecting, by the processor, one or more peak frequencies in a frequency domain of the fast Fourier transformed mixed audio signals. In addition, the method comprises estimating a velocity of the object. The method further comprises estimating, by the processor, a distance from a speaker of the controlled device to a microphone of the controlled device via the object based on the selected one or more peak frequencies and velocity of the object.

Other forms of the embodiment of the method described above are in a device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
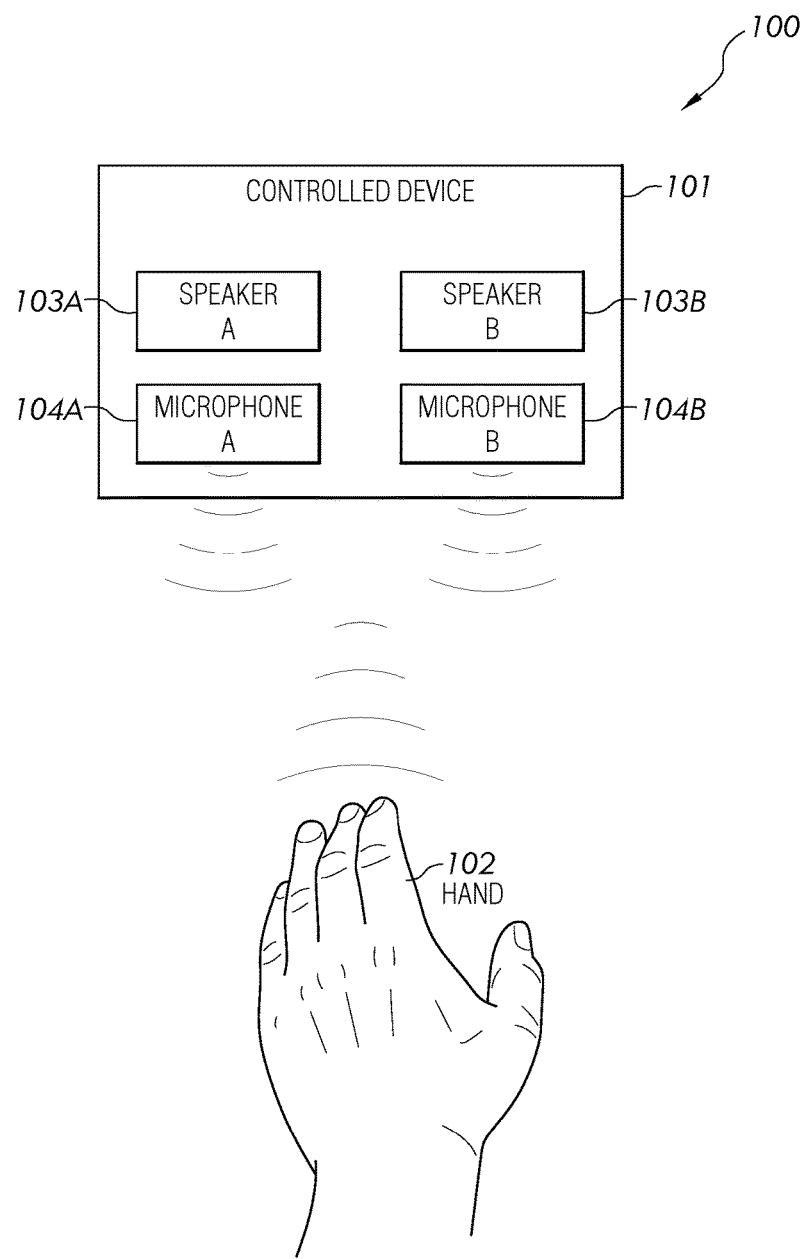
FIG. 1 illustrates a system configured in accordance with an embodiment of the present invention.

While the following discusses the present invention in connection with controlling a device (e.g., computers, game consoles, VR/AR headsets and smart devices, such as smartphones and smart watches) using the movement of a hand, the principles of the present invention may be applied to controlling the device using the movement of any object (e.g., pen, pencil). A person of ordinary skill in the art would be capable of applying the principles of the present invention to such implementations. Further, embodiments applying the principles of the present invention to such implementations would fall within the scope of the present invention.

As discussed below, the present invention provides a device-free motion tracking system that enables a new way for users to interact with the world by simply moving their hands. They can freely play video games, interact with VR/AR devices, and control smart appliances anywhere at any time. In one embodiment, such a tracking system uses widely available speakers and microphones on the controlled device (e.g., computers, game consoles, VR/AR headsets and smart devices, such as smartphones and smart watches). In one embodiment, the tracking system utilizes a novel approach that estimates the distance to the speaker from the hand and the velocity of the hand using a single chirp signal. Such information may be used to accurately locate the moving hand. By accurately locating the moving hand, a user will be able to interact and control devices by simply moving their hands.

As discussed below, in one embodiment, the device-free tracking system of the present invention is based on Frequency Modulated Continuous Wave (FMCW). The device to be controlled includes one or more speakers and one or more microphones which are used to emit and receive audio signals and track the hand movement. A pair of speakers and microphones may be co-located, and serve as an anchor point. Each speaker transmits chirp signals in an inaudible and non-overlapping spectrum band with a guard band in between, and the microphone collects the signals from the corresponding spectrum, mixes it with the transmitted signal, uses the peak frequencies to estimate the distance and velocity, which are in turn used to track the hand movement.

As discussed further below, the process begins by detecting the start of a "chirp" signal using cross correlation. Since the chirp signal is periodic, it only needs to be detected once and audio samples can be fetched continuously from the next sampling intervals (e.g., 100 ms). The distance between the speakers and the distance from the controlled device to the initial hand's position are estimated. Then audio signals are continuously fetched. Fast Fourier Transform (FFT) is performed on the fetched audio signals to detect the peak frequencies. It has been observed that the mixed signal in FMCW has a fundamental frequency determined by the parameters of the chirp sequence. This property is leveraged to filter out the reflection from the static objects and detect the reflection caused by the moving hand. Next, the Doppler shift is estimated and used to select the appropriate FMCW peak for distance estimation (distance between the controlled device and the hand). This distance estimation as well as the velocity estimation of the hand (obtained from the Doppler shift) are then used to continuously track the hand. A more detailed explanation of this process is provided below.

In the following description, numerous specific details are set forth to provide a thorough understanding of the present invention. However, it will be apparent to those skilled in the art that the present invention may be practiced without such specific details. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a system 100 configured in accordance with an embodiment of the present invention. Referring to FIG. 1, system 100 includes a device to be controlled 101 (referred to herein as "controlled device") by a hand 102 of a user. Controlled device 101 may be any computing device that contains speakers 103A-103B (identified as "speaker A" and "speaker B," respectively, in FIG. 1, respectively) and two microphones 104A-104B (identified as "microphone A" and "microphone B," respectively, in FIG. 1). Speakers 103A-103B may collectively or individually be referred to as speakers 103 or speaker 103, respectively. Microphones 104A-104B may collectively or individually be referred to as microphones 104 or microphone 104, respectively. While FIG. 1 illustrates controlled device 101 as including two speakers 103 and two microphones 104, controlled device 101 of the present invention is not to be limited to only including two speakers 103 and two microphones 104. Instead, controlled device 101 may include one or more speakers 103 and one or more microphones 104. Some examples of controlled devices 101 include but not limited to computers, video game consoles, VR/AR headsets, smartphones, smart watches, wearable devices, smart TVs and smart appliances. Controlled device 101 is configured to emit an audio signal through its speakers 103, whether audible or inaudible to humans. Furthermore, controlled device 101 is configured to receive an audio signal that is reflected by the user's hand 102 by microphones 104. This reflected audio signal is used by controlled device 101 to continuously track hand 102 in real time as discussed further below. A more detailed description of a hardware configuration of an embodiment of controlled device 101 is provided below in connection with FIG. 2.

Figure 2:
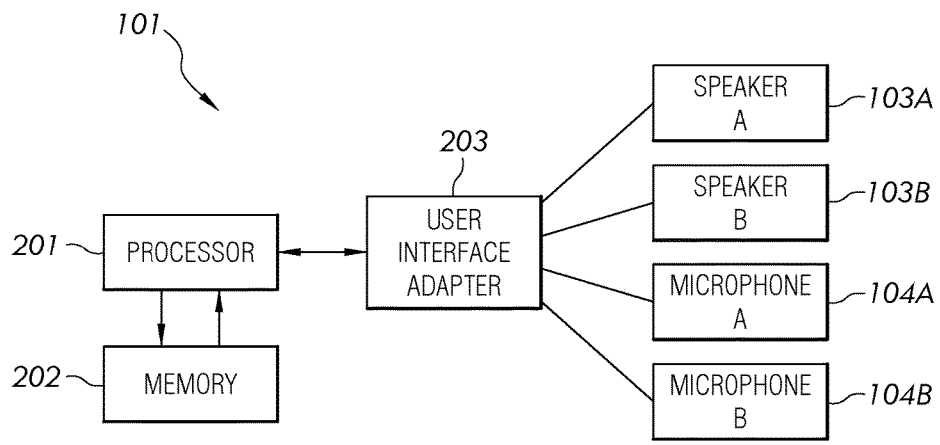
FIG. 2 illustrates a hardware configuration of a device to be controlled by the movement of a hand in accordance with an embodiment of the present invention.

Referring now to FIG. 2, FIG. 2 is a functional block diagram of an example of a controlled device 101 (FIG. 1). In this example, controlled device 101 includes one or more processors 201. Processor 201 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, electronic units, or a combination thereof.

Processor 201 is configured to store data received by one or more interfaces and process and store the data on a memory 202. Memory 202 can be implemented within processor 201 or external to processor 201. As used herein, the term memory refers to any type of long term, short term, volatile, nonvolatile, or other memory and is not to be limited to any particular type of memory or number of memories or type of media upon which memory is stored. In one embodiment, memory 202 stores an application, such as a program for controlling device 101 using hand movements by hand 102 (FIG. 1) by allowing the controlled device 101 to continuously track the movement of hand 102 using acoustic signals. In one embodiment, processor 201 is configured to execute the program instructions of applications stored in memory 202.

Furthermore, speakers 103A, 103B and microphones 104A, 104B are connected to controlled device 101 via a user interface adapter 203. Speakers 103A, 103B are configured to generate an audio signal (audible or inaudible to humans) at various frequencies. Furthermore, microphones 104A, 104B are configured to receive an audio signal that is reflected by the user's hand 102.

Controlled device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, smart TVs, smart appliances, Virtual Reality (VR), and Augmented Reality (AR) are all becoming increasingly popular. The key to their success is having an easy-to-use user interface to control the device (e.g., smart TVs, smart appliances and devices implementing VR/AR). Currently though such devices lack an easy-to-use user interface. Smart TVs are currently cumbersome to control by having the user navigate through various menus. Many smart appliances require users to manually launch smartphone applications and click through pages to control the smart appliance, which is even more cumbersome than turning on/off switches. VR and AR provide an immersive experience, and open the doors to new ways of training, education, meeting, advertising, travel, health care, emergency responses, and scientific experiments. However, the current user interface of devices implementing VR/AR are rather limited: they rely on tapping, swiping, voice recognition, or steering the camera towards the hand to make sure the hand is within the view and line-of-sight of the camera while wearing the headset. Hence, there is not currently a means for easily interacting and controlling devices, such as smart devices and device implementing VR/AR.

Figure 3:
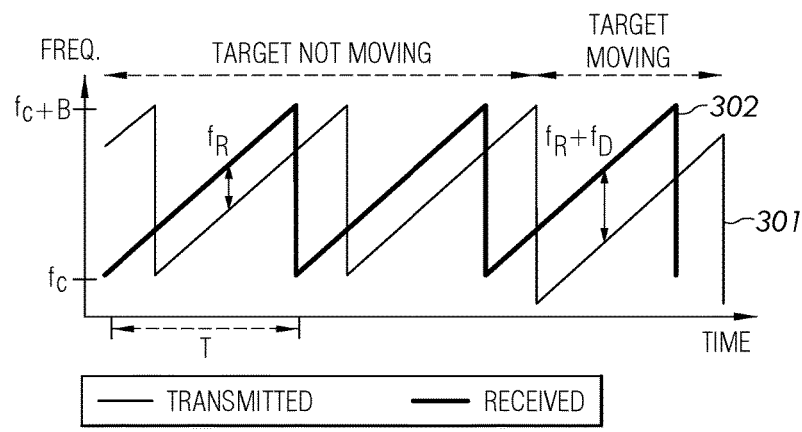
FIG. 3 illustrates the chirp signal using Frequency Modulated Continuous Wave (FMCW) in accordance with an embodiment of the present invention.
Figure 4:
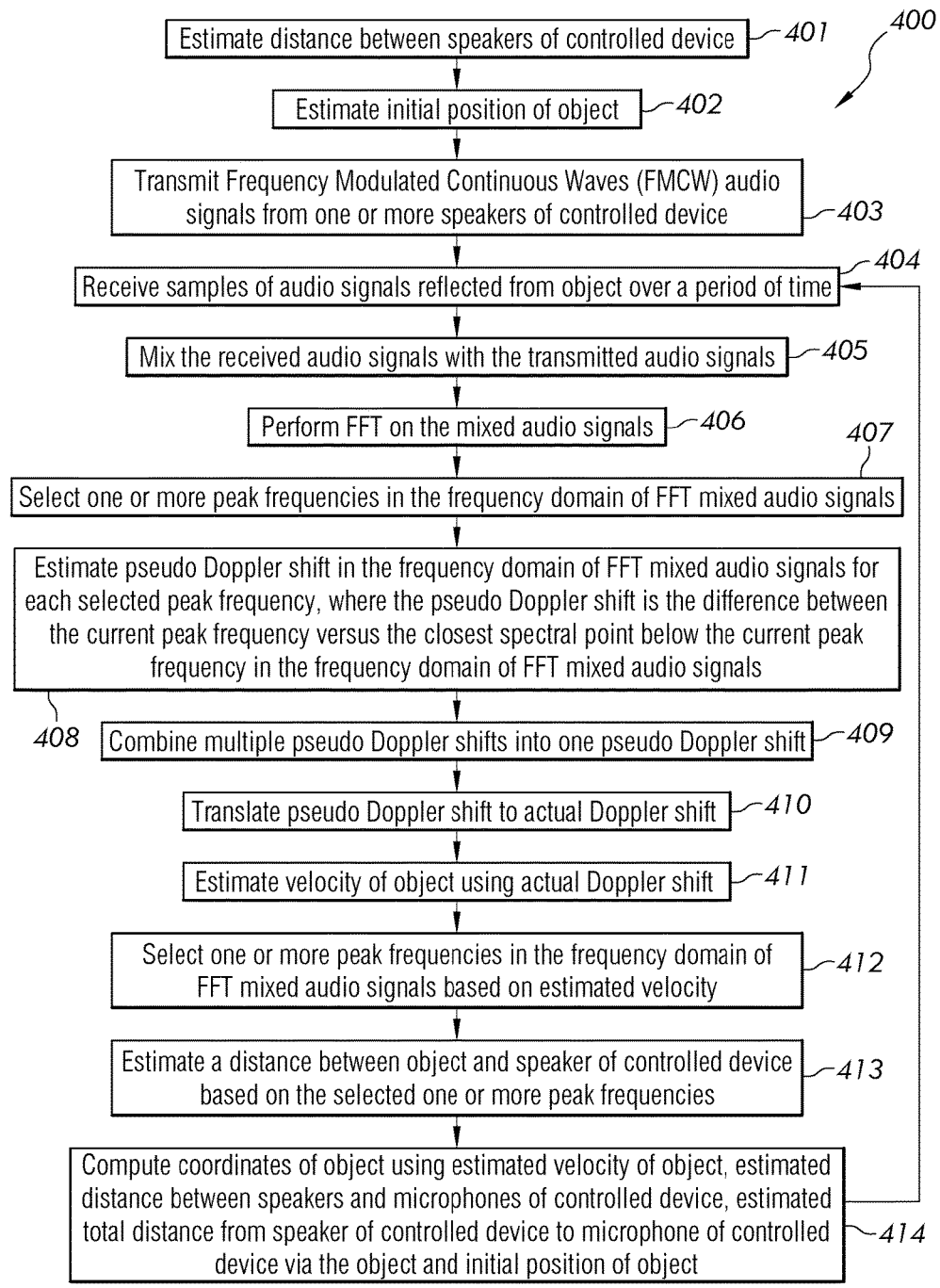
FIG. 4 is a flowchart of a method for controlling a device using hand movements by allowing the controlled device to continuously track the movement of the hand using acoustic signals in accordance with an embodiment of the present invention.
Figure 5:
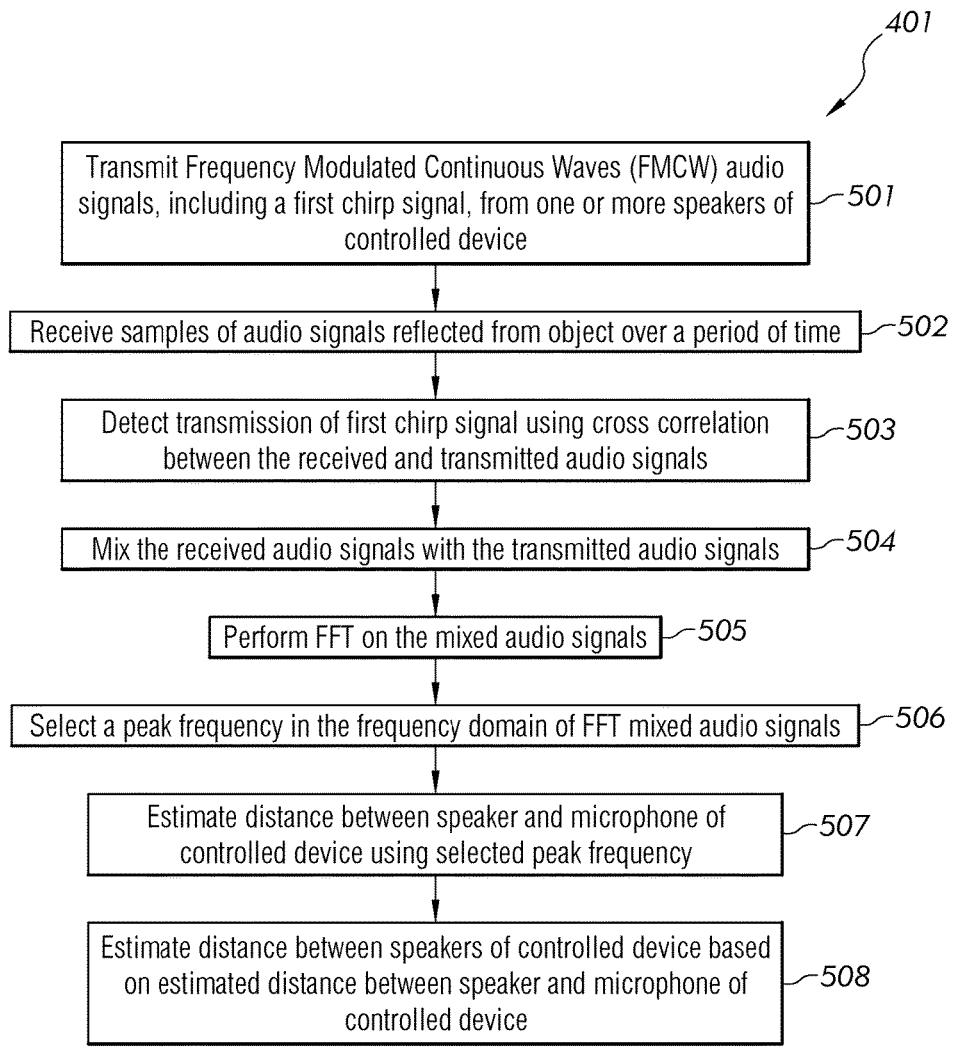
FIG. 5 is a flowchart of the sub-steps of estimating the distance between the speakers of the controlled device in accordance with an embodiment of the present invention.
Figure 6:
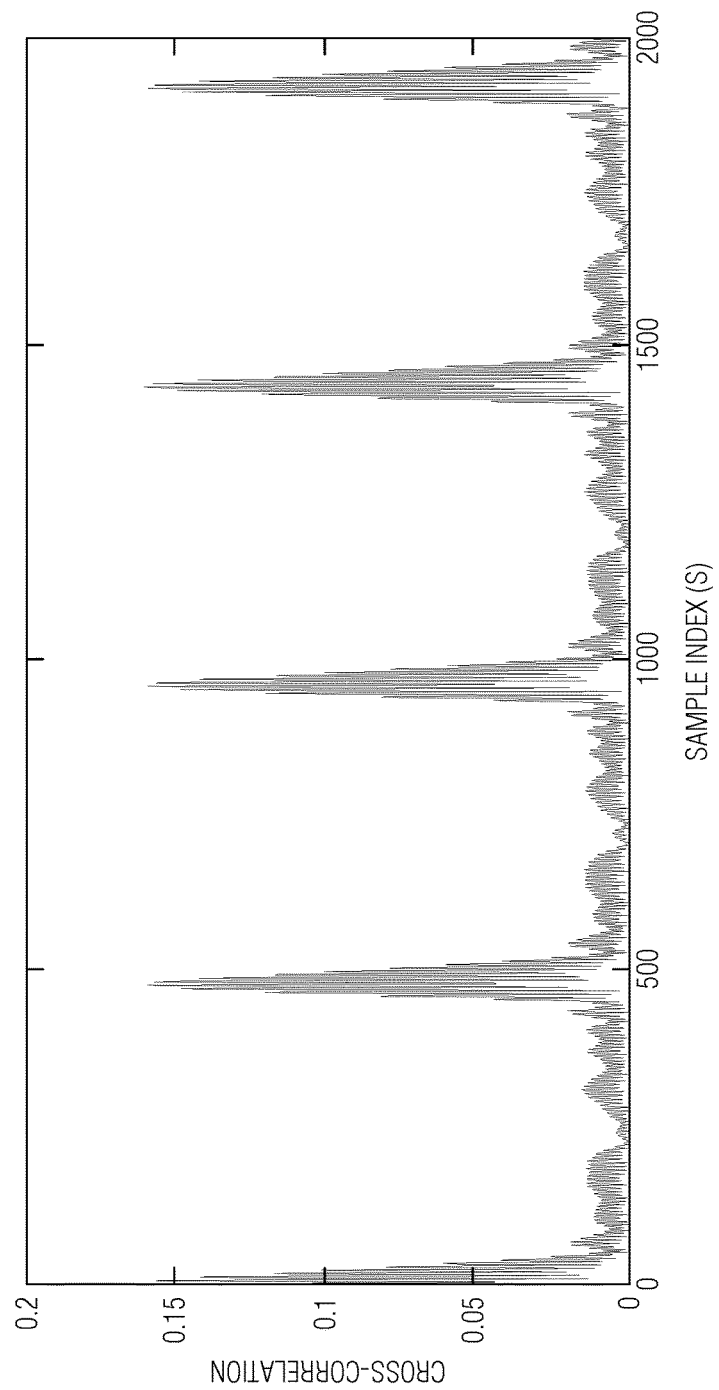
FIG. 6 shows a snapshot of the cross-correlation result in accordance with an embodiment of the present invention.
Figure 7:
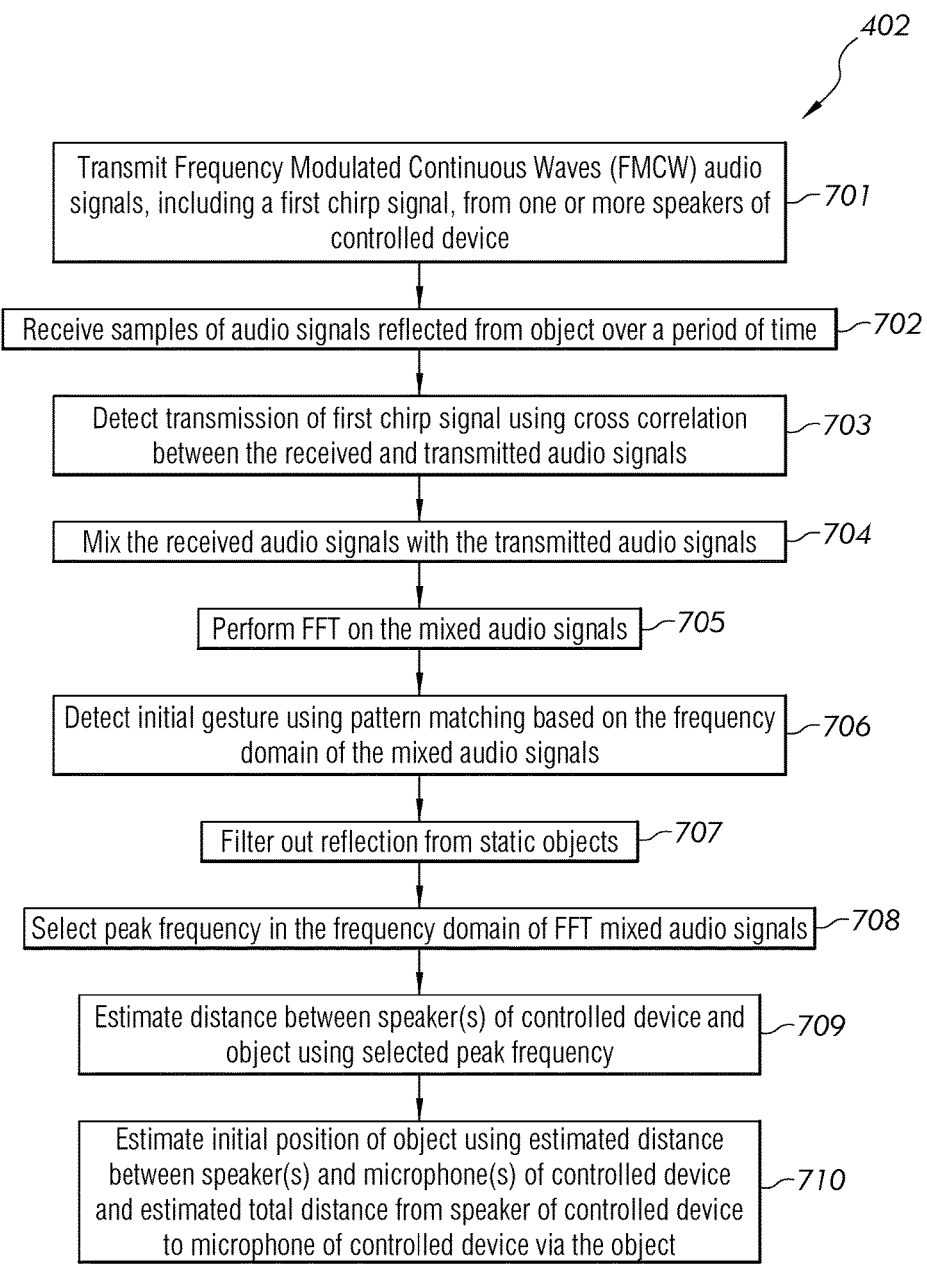
FIG. 7 is a flowchart of the sub-steps of estimating the initial position of the object, such as a hand, in accordance with an embodiment of the present invention.
Figure 8A:
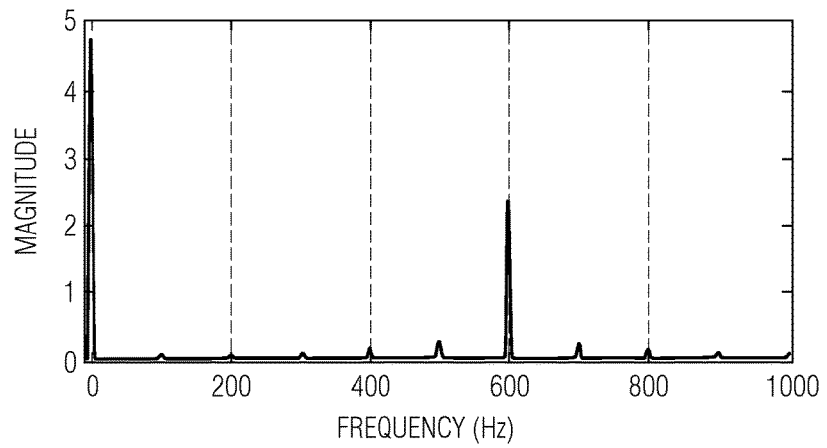
FIG. 8A shows the simulation result of FMCW range detection when the transmitter and receiver are both static and 0.5 m apart in accordance with an embodiment of the present invention.
Figure 8B:
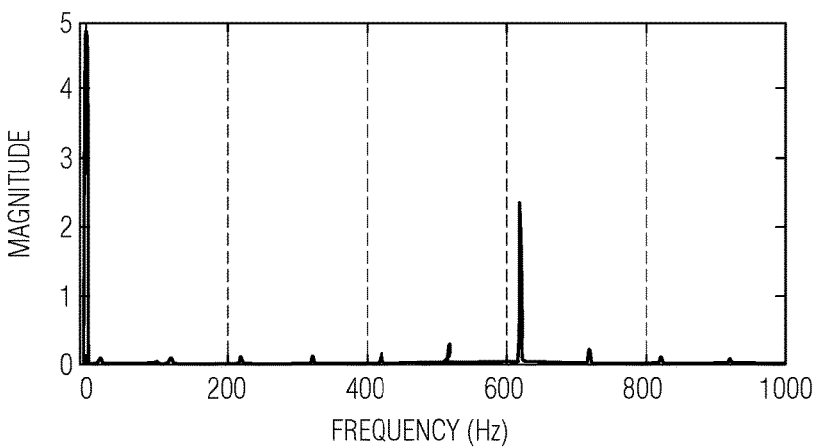
FIG. 8B illustrates the simulation result when the range is 0.5 m and the Doppler shift is 20 Hz in accordance with an embodiment of the present invention.
Figure 9A:
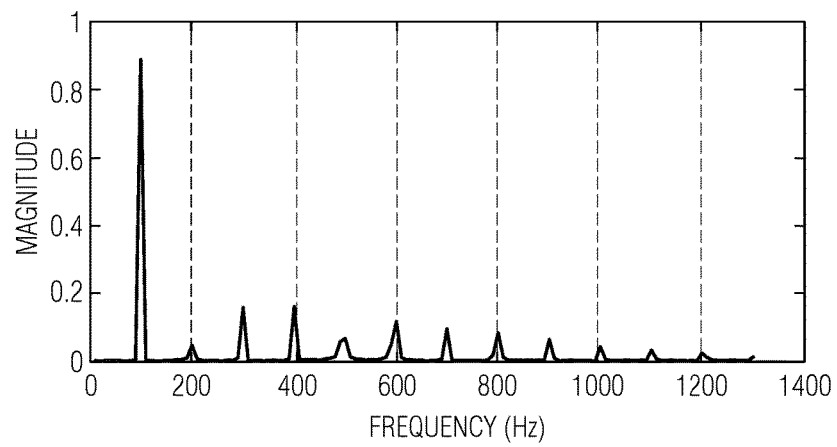
FIGS. 9A-9B show the FMCW signals with and without the peaks in the spectral points, respectively, while the hand is moving in accordance with an embodiment of the present invention.
Figure 9B:
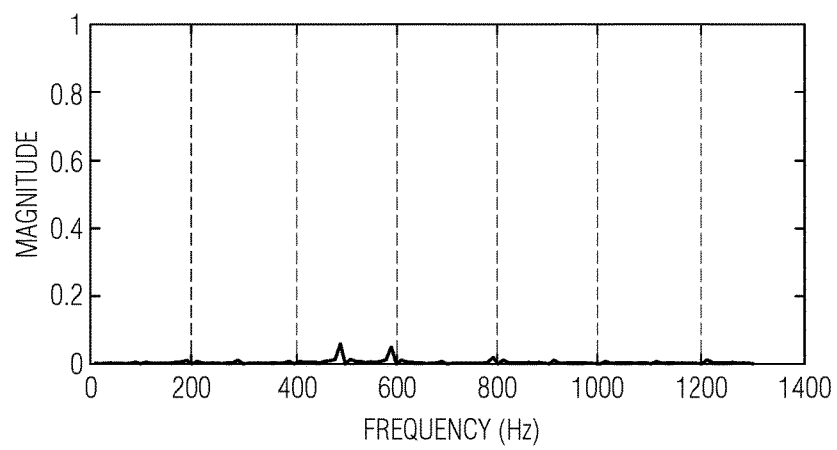
Figure 10:
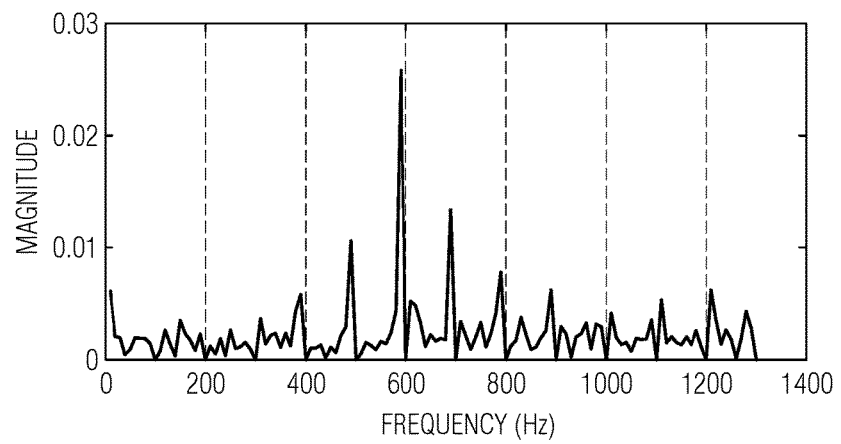
FIG. 10 shows a snapshot of the received FMCW signal while the hand is moving towards the microphone in accordance with an embodiment of the present invention.
Figure 11:
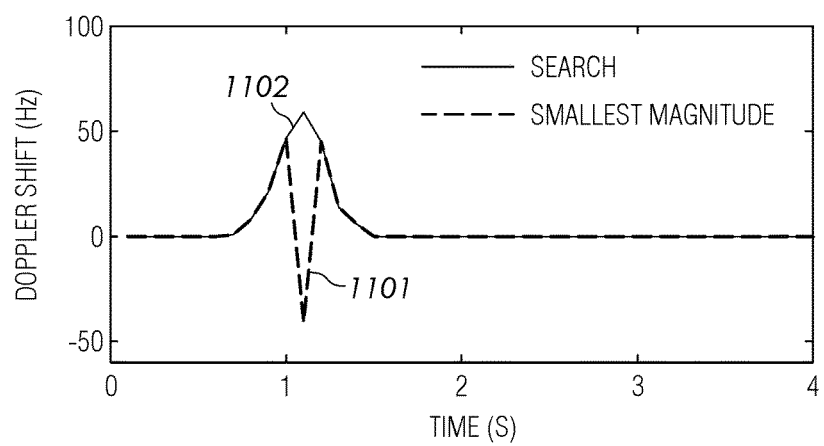
FIG. 11 shows an example of the Doppler shift estimation in accordance with an embodiment of the present invention.

The principles of the present invention provide a means for easily interacting and controlling devices, such as smart devices and devices implementing VR/AR, by continuously tracking the movement of a hand (e.g., hand 102 of FIG. 1)

of a user as discussed below in association with FIGS. 3-7, 8A-8B, 9A-9B and 10-11. FIG. 3 illustrates the chirp signal using Frequency Modulated Continuous Wave (FMCW). FIG. 4 is a flowchart of a method for controlling a device using hand movements by allowing the controlled device to continuously track the movement of the hand using acoustic signals. FIG. 5 is a flowchart of the sub-steps of estimating the distance between the speakers of the controlled device. FIG. 6 shows a snapshot of the cross-correlation result. FIG. 7 is a flowchart of the sub-steps of estimating the initial position of the object, such as a hand. FIG. 8A shows the simulation result of FMCW range detection when the transmitter and receiver are both static and 0.5 m apart. FIG. 8B illustrates the simulation result when the range is 0.5 m and the Doppler shift is 20 Hz. FIGS. 9A-9B show the FMCW signals with and without the peaks in the spectral points, respectively, while the hand (e.g., hand 102 of FIG. 1) is moving. FIG. 10 shows a snapshot of the received FMCW signal while the hand is moving towards the microphone. FIG. 11 shows an example of the Doppler shift estimation.

A brief discussion regarding Frequency Modulated Continuous Wave (FMCW) radar which is a widely used technique in radar to measure the distance to an object is deemed appropriate.

One way to estimate the distance d is to directly measure the propagation delay $\tau$ and use their relationship $d=\tau*\upsilon$, where $\upsilon$ is the propagation speed of the signal. However, this is challenging because a large bandwidth is needed in order to send a sharp pulse signal with a good time resolution. Instead, FMCW indirectly estimates the propagation delay based on the frequency shift of the chirp signal as follows as shown in FIG. 3. The "chirp" signal as used herein, refers to a signal in which the frequency increases (up-chirp) or decreases (down-chirp) with time.

FIG. 3 illustrates the chirp signal using FMCW in accordance with an embodiment of the present invention. As illustrated in FIG. 3, curve 301 shows a transmission chirp, whose frequency linearly increases over time. Curve 302 shows the received chirp. Let $f_c$, B, and T denote the carrier frequency, bandwidth, and duration of the chirp, respectively. The frequency of the signal at time t is given by $$f(t) = f_c + \frac{Bt}{T}.$$

The phase of the signal is calculated by integrating f(t) over time, which is:

$$u(t) = 2\pi\left(f_c t + B\frac{t^2}{2T}\right).$$

As a result, the transmitted chirp signal can be represented as $\upsilon_{tx}(t)=\cos(u(t))$, where its magnitude is assumed to be one for simplicity.

Consider that the transmitter and receiver are co-located. The transmitted signal is reflected by the target and received with the delay $\tau_d$. Therefore, the received signal at time t is $\upsilon_{rx}(t)=\upsilon_{tx}(t-\tau_d)$, which is:

$$\upsilon_{rx}(t) = \cos\left(2\pi f_c(t-\tau_d) + \frac{\pi B(t-\tau_d)^2}{T}\right),$$

where again the magnitude change is ignored. Let R, $V_c$, V denote the distance between the transceiver and target, the propagation speed, and the target's velocity. Then, the reflected signal is delayed by $\tau_d$:

$$\tau_d = \frac{2(R+Vt)}{V_c}. \tag{1}$$

The receiver multiplies the transmitted signal with the received signal in the time domain, which is $\upsilon_m(t)=\upsilon_{tx}(t) \upsilon_{rx}(t)$. The mixed signal $\upsilon_m(t)$ is called the Intermediate Frequency (IF) signal. By using cos A cos B=(cos(A−B)+cos(A+B))/2 and filtering out the high frequency cos(A+B) component, which has the frequency of the order $2f_c$, $\upsilon_m(t)$ becomes:

$$\upsilon_m(t) = \cos\left(2\pi f_c \tau_d + 2\pi t \frac{B\tau_d}{T} + \frac{2\pi B \tau_d^2}{T}\right).$$

By plugging Equation (1) into the above equation, $\upsilon_m(t)$ becomes:

$$\upsilon_m(t) = \cos\left(4\pi f_c \frac{R}{V_c} + 2\pi\left(\frac{2f_c V}{V_c} + \frac{2RB}{V_c T}\right)t + \frac{2\pi(R+Vt)^2}{Tc^2}\right). \tag{2}$$

The constant phase terms and quadratic term are ignored since the former does not change the frequency and the latter is too small to matter. Furthermore, the frequency of the IF signal $f_{iF}$ is approximated as:

$$f_{IF} = f_R + f_V \tag{3}$$

$$f_R = \frac{2RB}{V_c T} \tag{4}$$

$$f_V = \frac{2f_c V}{V_c} \tag{5}$$

As can be seen, the frequency shift includes (i) the frequency shift that is proportional to the distance to the target $f_R$, and (ii) the Doppler shift $f_V$ due to the movement of the target. The former depends on the distance and the latter depends on the velocity. These effects also are shown in FIG. 3, which compares the frequency change with and without movement and shows an additional shift coming from the Doppler shift when the target moves.

Turning now to FIG. 4, FIG. 4 is a flowchart of a method 400 for controlling a device (e.g., device 101 of FIGS. 1 and 2) using hand movements by allowing controlled device 101 to continuously track the movement of an object, such as a hand (e.g., hand 102 of FIG. 1) using acoustic signals in accordance with an embodiment of the present invention.

Referring to FIG. 4, in conjunction with FIGS. 1-3, in step 401, controlled device 101 estimates the distance between speaker 103 and microphone 104 of controlled device 101. A further description of the steps involved in estimating the distance between speakers 103 of controlled device 101 is provided below in connection with FIG. 5.

One can measure the distance between speakers 103 using a ruler or using a smartphone based calibration. Below introduces an even simpler procedure without any user intervention if microphones 104 are co-located with speakers 103.

FIG. 5 is a flowchart of the sub-steps of estimating the distance between speakers 103 of controlled device 101 (step 401) in accordance with an embodiment of the present invention.

Referring to FIG. 5, in conjunction with FIGS. 1-4, in step 501, controlled device 101 transmits Frequency Modulated Continuous Waves (FMCW) audio signals (whether audible or inaudible to humans), including a first chirp signal, from speaker(s) 103 to an object, such as hand 102.

In step 502, microphone 104 of controlled device 101 receives the samples of audio signals reflected from the object (e.g., hand 102) over a period of time.

In step 503, controlled device 101 detects the transmission of a first chirp signal from speaker 103 using cross correlation between the received and transmitted audio signals.

In step 504, controlled device 101 mixes the received audio signal with the transmitted audio signals.

In order to mix the transmitted and the received signal (transmitted signal refers to the signal transmitted by speaker 103 and the received signal refers to the transmitted signal reflected from the user's hand 102), the program of the present invention should know the exact start time of the chirp signal transmission. This is challenging even if the audio signal transmission and the reception are implemented in the same program and running on the same machine, due to a random delay between the call of the audio play function and the play time of the audio file. To avoid the uncertainty, the beginning of the chirp signal is detected using cross-correlation between the received audio signal and the original chirp signal. As speaker 103 and microphone 104 are co-located, the signal is considered to be received as soon as it is transmitted. By finding the peak in the cross-correlation output, the start of the chirp sequence in the received signal can be detected, which is also the start of the transmitted chirp signal. FIG. 6 shows one snapshot of the cross-correlation result in accordance with an embodiment of the present invention. In an illustrative embodiment, FIG. 6 shows the peak every 480 samples, which corresponds to an exemplary chirp duration.

In step 505, controlled device 101 performs fast Fourier Transform (FFT) on the mixed audio signals. In one embodiment, controlled device 101 further filters out the reflection from the static objects.

In step 506, controlled device 101 selects a peak frequency in the frequency domain of the FFT mixed audio signals.

In step 507, controlled device 101 estimates the distance between speaker 103 and microphone 104 of controlled device 101 using the selected peak frequency.

Suppose the transmitted and received signals are synchronized using the above procedure. One can measure the distance from the left speaker (e.g., speaker 103A) to the right microphone (e.g., microphone 104B) using the FMCW signal transmitted from the left speaker based on Equation (4). Likewise, one can measure the same distance from the right speaker (e.g., speaker 103B) to the left microphone (e.g., microphone 104A). To improve the accuracy, one can average the distance measured from both directions. One can further measure the distances for a longer duration and then obtain the average since speakers 103 are static.

In step 508, controlled device 101 estimates the distance between speakers 103 of controlled device 101 using the estimated distance between speaker 103 and microphone 104 of controlled device 101.

In one embodiment, a speaker 103 and a microphone 104 are co-located and the distance between speakers 103 of controlled device 101 is equal to the distance between a speaker 103 and another speaker's 103 co-located microphone 104. In another embodiment, all speakers 103 and microphones 104 are placed along one line, and the distance between any two speakers 103 can be estimated based on the distances between the pairs of a speaker 103 and a microphone 104 (e.g., estimating the distance between speaker 1 and speaker 2 based on the distances between speaker 1 and microphone 1, speaker 2 and microphone 2, speaker 1 and microphone 2, and speaker 2 and microphone 1).

Returning now to FIG. 4, in conjunction with FIGS. 1-3, in step 402, controlled device 101 estimates the initial position of the object, such as hand 102. A further description of the steps involved in estimating the initial position of the object, such as hand 102, is provided below in connection with FIG. 7.

FIG. 7 is a flowchart of the sub-steps of estimating the initial position of the object (step 402) in accordance with an embodiment of the present invention.

Referring to FIG. 7, in conjunction with FIGS. 1-6, in step 701, controlled device 101 transmits Frequency Modulated Continuous Waves (FMCW) audio signals (whether audible or inaudible to humans), including a first chirp signal, from speaker(s) 103 to the object, such as hand 102, as in step 501.

In step 702, microphone 104 of controlled device 101 receives the samples of audio signals reflected from the object (e.g., hand 102) over a period of time as in step 502.

In step 703, controlled device 101 detects the transmission of a first chirp signal from speaker 103 using cross correlation between the received and transmitted audio signals as in step 503.

In step 704, controlled device 101 mixes the received audio signal with the transmitted audio signals as in step 504.

In step 705, controlled device 101 performs fast Fourier Transform (FFT) on the mixed audio signals as in step 505.

In step 706, controlled device 101 detects the initial hand gesture using pattern matching based on the frequency domain of the mixed audio signals.

A user initializes tracking by performing an initial gesture. In one embodiment, an initial gesture may correspond to a grabbing gesture (e.g., closing and opening a hand twice) as the initial gesture. In one embodiment, the initial gesture can be recognized using pattern matching. When a user performs the initial gesture, the received signal reflected from the object (e.g., hand 102) is recorded. The received signal is mixed with the transmitted signal, and fast Fourier transform (FFT) is performed on the mixed trace. The FFT of the mixed trace is recorded. The above process may be repeated to obtain multiple positive training traces while the user is performing the initial gesture. Similarly, negative training traces from the FFT of the mixed traces are collected while the user is not performing the initial gesture. To detect the initial gesture later, recently received FFTs of the mixed trace are matched against the positive or negative training trace using pattern matching algorithms to detect an initial gesture.

In step 707, controlled device 101 filters out the reflection from the static objects. That is, spectral points are filtered resulting from the reflection from the static objects.

In step 708, controlled device 101 selects a peak frequency in the frequency domain of the FFT mixed audio signals as in step 506.

In step 709, controlled device 101 estimates the distance between speaker(s) 103 of controlled device 101 and the object, such as hand 102, using the selected peak frequency.

In step 710, controlled device 101 estimates the initial position of the object, such as hand 102, using the estimated distance between speaker(s) 103 and microphone(s) 104 of controlled device 101 and the estimated total distance from speaker 103 of controlled device 101 to microphone 104 of controlled device 101 via the object, such as hand 102.

The estimated distance is the sum of the distance from speaker 103 to the object (e.g. hand 102) and the distance from the object to microphone 104. If the pair consisting of speaker 103 and microphone 104 is co-located, the distance between speaker 103 and the object is half the estimated distance. When the number of speakers 103 and the number of dimensions are both equal to 2, the position of hand 102 is estimated as the intersection of all the circles centered at each of the speakers 103 with the radius derived from $$R = \frac{\Delta f V_c T}{2B}.$$

Similarly, if both the number of speakers 103 and dimensions are 3, the solution is the intersection of the spheres centered at these speakers 103 with the corresponding radii. If there are more speakers 103 than the number of dimensions (i.e., there are more constraints than the unknowns), one can localize hand 102 by solving the following simple optimization:

$$\min_P \sum_i |dist(P - A_i) - dist_i|^2,$$

where P is the coordinate of hand 102, $A_i$ is the i-th speaker's coordinate, and $dist_i$ is the distance between the i-th speaker and hand 102 estimated using FMCW. Essentially, this objective minimizes the total error with respect to all the FMCW distance measurements from speakers 103.

If each pair of speaker 103 and microphone 104 is not co-located, the object is located at the intersection of ellipses (2D) or ellipsoids (3D) whose foci are at speaker 103 and microphone 104 respectively, and the total distance to the foci is the corresponding estimated distance. Therefore, the object's position can be estimated based on the total distance to the foci.

Returning to FIG. 4, in conjunction with FIGS. 1-3, in step 403, controlled device 101 transmits Frequency Modulated Continuous Waves (FMCW) audio signals (whether audible or inaudible to humans) from speaker(s) 103 to the object, such as hand 102.

In step 404, microphone 104 of controlled device 101 receives samples of the audio signals reflected from the object, such as hand 102, that were emitted by speaker(s) 103 over a period of time.

In step 405, controlled device 101 mixes the received audio signals with the transmitted audio signals.

In step 406, controlled device 101 performs fast Fourier Transform (FFT) on the mixed audio signals.

In step 407, controlled device 101 selects one or more peak frequencies in the frequency domain of the FFT mixed audio signals.

When hand 102 is performing the initial gesture, FFT is performed to determine the peak frequencies in the mixed signals. Then the frequencies are filtered out at the spectral points to remove reflection from the static objects. Next, one of the remaining peaks is selected based on its magnitude and/or consistency with the velocity estimated from the actual Doppler shift. The selected peak is rounded to the closest spectral point, and the rounded frequency is converted to the distance estimate using Equation (4). This procedure works because the initial gesture has slow speed, well below 50 Hz.

Consider a chirp signal (shown in FIG. 3) propagates over the medium and arrives at the receiver after a delay $\tau_d$. As shown in Equation (3), without movement the range (distance between speaker 103 and hand 102) can be estimated based on the frequency shift as follows:

$$R = \frac{I_p c T}{B}.$$

The transmitted chirp signal has fundamental frequencies that are all multiples of the frequency 1/T. In other words, in the frequency domain, it has spectral points with an interval of 1/T Hz. For example, when the chirp interval is 0.01 s, it has spectral points every 100 Hz. The received signal $v_r(t)$ is a simple time shifted version of the transmitted signal $v_t(t)$, and has the same period. $v_m(t)=v_r(t)v_t(t)$, has the same period since the periodicity is preserved when two periodic signals with the same period are multiplied. Therefore, the frequency shifts in FMCW exhibit peaks at discrete frequencies, all of which are multiples of 1/T Hz without any movement.

FIG. 8A shows the simulation result of FMCW range detection when the transmitter and receiver are both static and 0.5 m apart in accordance with an embodiment of the present invention. The carrier frequency, bandwidth, and the duration of the chirp signal are 17 KHz, 2 KHz, and 0.01 s, respectively. FIG. 8A is the FFT result of $v_m(t)$. $v_m(t)$ has power every 100 Hz. There are two major peaks at 0 Hz and 600 Hz. The peak at 0 Hz is caused by the self-interference that the transmitted signal is directly received without reflection. The self-interference can be filtered by ignoring the peak around 0 Hz. Then another peak at 600 Hz is detected and considered to be due to the reflection from the target. Using Equation (4), one can determine that the total distance is 1.02 m, and the distance from the transceiver to the target is half of that distance: 0.51 m since the total distance includes both forward and reflected paths.

Initial experiments have shown that the above FMCW approach yields rough estimation of the hand position but the error is significant: 10 cm, which is too large for many applications. There are several factors that contribute to the large error. First, there are multiple peaks, some of which are due to reflection from other objects. Second, even ignoring the reflection from static objects, the signals can still be reflected by multiple body parts that move together with hand 102. These body parts have different distances from speakers 103. Moreover, even considering reflection from the same point, the reflected signal may still traverse different paths to reach microphone 104. These effects together contribute to multiple FMCW peaks. It is important to select the peak that comes through the direct path from hand 102. Third, the frequency change in FMCW partly comes from the propagation delay and partly comes from the Doppler shift. This is shown in FIG. 8B, which plots the simulation result when the range is 0.5 m and the Doppler shift is 20 Hz in accordance with an embodiment of the present invention. In this case, a combined frequency shift at 620 Hz is observed. It is important to decouple the overall shift to the distance-based shift and Doppler shift to achieve high accuracy.

Reflected signals are challenging to use for tracking because there are possibly many objects around the target that reflect the signal. There are multiple peaks in the FMCW. As a result, the peaks caused by the hand movement should be extracted. It is reasonable to assume only hand 102 is moving and the other objects are static. Based on this assumption, one can ignore all peaks at the spectral points (i.e., integer multiples of the fundamental frequency) since they do not have Doppler shift. FIGS. 9A-9B show the FMCW signals with and without the peaks in the spectral points, respectively, while the hand is moving in accordance with an embodiment of the present invention. Ignoring the spectral points, one can clearly observe the shift caused by the moving hand 102.

In step 408, controlled device 101 estimates the "pseudo Doppler shift" in the frequency domain of the FFT mixed audio signals for each selected peak frequency, where the pseudo Doppler shift is the difference between the current peak frequency versus the closest spectral point below the current peak frequency in the FFT mixed audio signals.

The notion of "pseudo Doppler shift" is now introduced. It is defined as the difference between the current peak frequency versus the closest spectral point below the current peak frequency. If the fundamental frequency is 100 Hz and the peak frequency is 620 Hz, then the pseudo Doppler shift is 20 Hz. Similarly, a peak frequency at 660 Hz has the pseudo Doppler shift of 60 Hz. In this case, the actual Doppler shift may be 60 Hz or −40 Hz. As discussed further below, the pseudo Doppler shift is translated to the actual Doppler shift. It is noted that the pseudo Doppler shift is defined as the difference with respect to the spectral point below the current peak frequency for consistency. For example, suppose there are two peaks at 660 Hz and 540 Hz. To combine the two estimates, one should combine 60 Hz with 40 Hz, instead of −40 Hz with 40 Hz.

In step 409, controlled device 101 combines the multiple pseudo Doppler shifts into one pseudo Doppler shift.

As mentioned earlier, multiple peaks exist even after filtering out the peaks caused by reflection from static objects because the signal is reflected by different body parts that move together with the hand and they may have different distances from speaker 103. Interestingly, there is a benefit of getting multiple peaks—if some or all of the peaks correspond to the body parts with similar velocities, one essentially obtains multiple estimates of the Doppler shift and can combine these multiple estimates to enhance the accuracy using Maximum Ratio Combining (MRC). Specifically, one can use the highest peak and multiple peaks around the highest peak to estimate the pseudo Doppler shift as follows.

1. One can divide the whole spectrum into multiple spectrum slots that span from $$\left[\frac{n}{T} - \frac{1}{2T}\right] \text{Hz to} \left[\frac{n}{T} + \frac{1}{2T}\right] \text{Hz},$$

where n is an integer smaller than B×T. For example, when T is 0.01 s, the n-th slot spans (n×100−50, n×100+50).

2. The slot with the maximum peak is searched and denoted as k. The pseudo Doppler shift is computed in the slot k and its 4 nearby slots.

3. The pseudo Doppler shifts are combined in these 5 slots using the following weighted average:

$$f_D = \frac{\sum_{i=k-2}^{i=k+2} \sigma_i f_{d,i}}{\sum_{i=k-2}^{i=k+2} \sigma_i},$$

where $\sigma_i$ and $f_{d,i}$ denote the peak magnitude and pseudo Doppler shift during the i-th slot, respectively. The highest peak and its nearby peaks are used for the Doppler estimation of hand 102, because his/her hand 102 is the closest moving object to speakers 103 when a user is facing the controlled device 101 (a common usage scenario).

As an example, FIG. 10 shows a snapshot of the received FMCW signal while hand 102 is moving towards microphone 104 in accordance with an embodiment of the present invention. As illustrated in FIG. 10, the highest peak is in slot 6. The peaks from slots 4 to 8 are combined to get the final estimate of the pseudo Doppler shift.

In step 410, controlled device 101 translates the pseudo Doppler shift to the actual Doppler shift.

As mentioned above, the frequency shift comes partly from the propagation delay and partly from the Doppler shift. To decompose the frequency shift, it has been observed that the shift caused by the propagation delay should be multiples of the fundamental frequency and the difference between the spectral point and the frequency of the current peak is caused by the Doppler shift. It has been found that the hand movement is typically within 1 m/s, and its corresponding frequency shift should be within 100 Hz. Given the overall frequency change, there are two choices: reminder(currFreq,FF) or 100-reminder(currFreq,FF). In the previous example, the Doppler shift in the 660 Hz frequency difference can be either reminder(660,100)=60 Hz or reminder(660,100)−100=−40 Hz.

One approach is to select the Doppler shift with the smallest magnitude. For example, one selects −40 Hz instead of 60 Hz when the peak frequency is at 660 Hz. However, this selection may be off since occasionally hand 102 can generate more than a 50 Hz Doppler shift. FIG. 11 shows an example of the Doppler shift estimation in accordance with an embodiment of the present invention. At 1.1 seconds, the actual Doppler shift is 59 Hz, but this scheme (see curve 1101) estimates −41 Hz, which results in a significant tracking error.

To enhance the accuracy, a simple search is used based on the previous movement (see curve 1102 "search"). It tries each of the two choices every slot and picks the combination that minimizes the velocity change over all the slots. One can vary the window size (number of slots used to compute the velocity change) to run the exhaustive search. Results have shown that a window size of 1, which essentially picks the current Doppler shift that is closest to the previous Doppler shift, is already good enough. This is because the Doppler shift of the hand movement during the first 0.1-second slot (starting from no movement) is likely to be small: well below 50 Hz and easy to select from the two candidates. Once the Doppler shift of the previous slot is correct, the next one will be correct in a greedy algorithm (assuming minimizing the velocity change leads to the correct selection). In FIG. 11, the "search" (see curve 1102) selects the correct Doppler shift. Therefore, the MRC output discussed above is used to estimate the pseudo Doppler shift and the "search" is applied to translate the pseudo Doppler shift to the actual Doppler shift.

In step 411, controlled device 101 estimates the velocity of the movement of the object, such as hand 102, using the actual Doppler shift. The velocity estimate of the movement of hand 102 is then estimated using the estimated actual Doppler shift in Equation (5) as discussed above.

In step 412, controlled device 101 selects one or more peak frequencies in the frequency domain of the FFT mixed signals based on the estimated velocity of the movement of the object.

Due to the multipath, the highest peak may not come through the direct path from hand 102. One can use the above Doppler estimate to refine the range estimation ("range estimation" refers to the distance between hand 102 and controlled device 101, specifically speaker 103 of controlled device 101). In particular, instead of using the frequency of the highest peak to estimate the range, a peak whose distance change is most consistent with the one estimated by the Doppler shift is found. This is based on the observation that Doppler estimation in a short interval is more reliable than the range estimation. Specifically, let a denote the velocity from the current Doppler estimation and $t_s$ denote the sampling interval. Then $v \cdot t_s$ is the distance change during the current interval estimated using the velocity. Meanwhile, one can estimate the distance change from the FMCW. For each of the five peaks near the highest peak, the distance change from the previous position is computed (i.e., $|d^i(t)-d(t-1)|$)), where $d(t-1)$ is the previous distance and $d_i(t)$ is the current distance derived using the i-th FMCW peak according to Equation (3). The particular i that is selected is the one that minimizes $||d^u(t), d(i-1)|-v \cdot t_s|$. $d^i(t)$ is then used as the range in the current interval.

In step 413, controlled device 101 estimates the distance between the object, such as hand 102, and speaker 103 of controlled device 101 based on the selected one or more peak frequencies using Equation (4).

In step 414, controlled device 101 computes the coordinates of the object, such as hand 102, using the estimated velocity of the object, such as hand 102, the estimated distance between speakers 103 and microphones 104 of controlled device, the estimated total distance from speaker 103 of controlled device 101 to microphone 104 of controlled device 101 via the object and the initial position of the object, such as hand 102. Upon computing the coordinates of the object, such as hand 102, controlled device 101 continues to receive samples of the audio signals reflected from the object, such as hand 102, that were emitted by speaker(s) 103 over the next period of time (e.g., 100 ms) in step 404.

Given the initial position of hand 102 discussed above, one can continuously track the hand's movement using the range and the Doppler shift together. One might wonder why one would not track the movement of hand 102 solely based on the range. This is because using range alone does not provide a high enough accuracy and exploiting the Doppler shift improves the tracking accuracy. Let $R_k[t]$ and $f_{D,k}[t]$ denote the distance and Doppler shift from the anchor point k at time t, respectively. In addition, the distance measurement is obtained using the velocity from the Doppler shift and the previous position (which is derived from the initial position). The Doppler based distance $R_{D,k}[t]$ is as follows:

$$R_{D,k}[t] = D_k[t-1] + v \cdot t_s = D_k[t-1] + \left(\frac{f_{D,k}[t]}{f_k} V_c\right) t_s,$$

where $D_k[t-1]$ is the distance from the k-th speaker at the time slot t−1, $f_k$ is the carrier frequency of speaker 103, $V_c$ is the propagation speed of the audio signal, and $t_s$ is the FMCW sampling interval.

Using two independent distance measurements $R_k[t]$ and $R_{D,k}[t]$, the current position (x, y) can be found by solving the following optimization problem:

$$\min_{x,y} \alpha \sum_{k=1}^{2} \left(\sqrt{(x_k - x)^2 + (y_k - y)^2} - R_k[t]\right)^2 +$$

$$\beta \sum_{k=1}^{2} \left(\sqrt{(x_k - x)^2 + (y_k - y)^2} - R_{D,k}[t]\right)^2,$$

where $(x_k, y_k)$ is the position of the k-th speaker, and $\alpha$ and $\beta$ are the constant weighting factors determined by the reliability of the range and Doppler shift estimation results, respectively. In the exemplary evaluation, $\alpha$ was set to 0.5 and $\beta$ was set to 1 since the Doppler shift was found to be more accurate than FMCW.

Hence, the device-free motion tracking system of the present invention provides a new way for users to interact with the world by simply moving their hands. Users can freely play video games, interface with VR/AR devise, and control smart appliances anywhere at any time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for tracking movement of an object, the method comprising:
   transmitting audio signals from one or more speakers to said object;
   receiving samples of said audio signals reflected from said object over a period of time;
   mixing said received audio signals with said transmitted audio signals;
   performing, by a processor, a fast Fourier transform on said mixed audio signals;
   selecting, by said processor, one or more peak frequencies in a frequency domain of said fast Fourier transformed mixed audio signals;
   estimating a velocity of said object; and
   estimating, by said processor, a distance from a speaker of a controlled device to a microphone of said controlled device via said object based on said selected one or more peak frequencies and velocity of said object.

2. The method as recited in claim 1 further comprising:
   estimating coordinates of said object using said estimated distance from said speaker of said controlled device to said microphone of said controlled device via said object, said estimated velocity of said object, estimated distances between all speakers of said controlled device and an estimated distance between each pair of said speakers and microphones of said controlled device.

3. The method as recited in claim 1 further comprising:
estimating a pseudo Doppler shift in said frequency domain of said fast Fourier transformed mixed audio signals, wherein said pseudo Doppler shift is a difference between a current peak frequency versus a closest spectral point below said current peak frequency in said fast Fourier transformed mixed audio signals; and
translating said pseudo Doppler shift to an actual Doppler shift to estimate said velocity of said object.

4. The method as recited in claim 3 further comprising:
detecting peak frequencies in said fast Fourier transformed mixed audio signals;
filtering peak frequencies at spectral points;
selecting peak frequencies from remaining unfiltered peak frequencies;
estimating a Doppler shift for each of the selected peak frequencies; and
combining said estimated Doppler shifts to derive said pseudo Doppler shift.

5. The method as recited in claim 3 further comprising:
translating said pseudo Doppler shift to said actual Doppler shift within a time window based on a change in said pseudo Doppler shift within said time window.

6. The method as recited in claim 3 further comprising:
selecting one or more peak frequencies in said frequency domain of said fast Fourier transformed mixed audio signals based on their magnitude and said estimated velocity of said object.

7. The method as recited in claim 1 further comprising:
estimating an initial position of said object using said estimated distance from said speaker of said controlled device to said microphone of said controlled device via said object; and
computing coordinates of said object using said estimated distance from said speaker of said controlled device to said microphone of said controlled device via said object, said estimated velocity of said object and said initial position of said object.

8. The method as recited in claim 7, wherein an initial distance of said object is estimated by filtering out spectral points, selecting a peak out of the remaining peaks based on their amplitude and/or consistency with said estimated velocity of said object estimated from an actual Doppler shift, rounding said selected peak to the closest spectral points to form a rounded frequency, and converting said rounded frequency to said initial distance estimate of said object.

9. The method as recited in claim 1 further comprising:
estimating a distance between said speaker and said microphone of said controlled device;
estimating a distance between speakers of said controlled device using said distance between said speaker and said microphone of said controlled device; and
computing coordinates of said object using said estimated distance from said speaker of said controlled device to said microphone of said controlled device via said object, said estimated velocity of said object, said estimated distance between speakers of said controlled device and an estimated distance between said speakers and microphones of said controlled device.

10. The method as recited in claim 1 further comprising:
detecting an initial gesture; and
estimating an initial position of said object in response to detecting said initial gesture.

11. The method as recited in claim 10 further comprising:
detecting said initial gesture by collecting positive traces of said fast Fourier transformed mixed audio signals while a user is performing said initial gesture and collecting negative traces of said fast Fourier transformed mixed audio signals while said user is not performing said initial gesture; and
matching recently received fast Fourier transformed mixed audio signals against said positive or negative traces using a pattern matching algorithm to detect said initial gesture.

12. The method as recited in claim 1 further comprising:
filtering out a reflection from static objects.

13. The method as recited in claim 1, wherein said object is a hand or a pen.

14. The method as recited in claim 1, wherein said controlled device comprises one of the following: a computer, a video game console, an augmented reality/virtual reality headset, a smartphone, a smart watch, a wearable device, a smart TV and a smart appliance.

15. A computer program product for tracking movement of an object, the computer program product comprising a non-transitory computer readable storage medium having program code embodied therewith, the program code comprising the programming instructions for:
transmitting audio signals from one or more speakers to said object;
receiving samples of said audio signals reflected from said object over a period of time;
mixing said received audio signals with said transmitted audio signals;
performing a fast Fourier transform on said mixed audio signals;
selecting one or more peak frequencies in a frequency domain of said fast Fourier transformed mixed audio signals;
estimating a velocity of said object; and
estimating a distance from a speaker of a controlled device to a microphone of said controlled device via said object based on said selected one or more peak frequencies and velocity of said object.

16. The computer program product as recited in claim 15, wherein the program code further comprises the programming instructions for:
estimating coordinates of said object using said estimated distance from said speaker of said controlled device to said microphone of said controlled device via said object, said estimated velocity of said object, estimated distances between all speakers of said controlled device and an estimated distance between each pair of said speakers and microphones of said controlled device.

17. The computer program product as recited in claim 15, wherein the program code further comprises the programming instructions for:
estimating a pseudo Doppler shift in said frequency domain of said fast Fourier transformed mixed audio signals, wherein said pseudo Doppler shift is a difference between a current peak frequency versus a closest spectral point below said current peak frequency in said fast Fourier transformed mixed audio signals; and
translating said pseudo Doppler shift to an actual Doppler shift to estimate said velocity of said object.

18. The computer program product as recited in claim 17, wherein the program code further comprises the programming instructions for:

detecting peak frequencies in said fast Fourier transformed mixed audio signals;
filtering peak frequencies at spectral points;
selecting peak frequencies from remaining unfiltered peak frequencies;
estimating a Doppler shift for each of the selected peak frequencies; and
combining said estimated Doppler shifts to derive said pseudo Doppler shift.

19. The computer program product as recited in claim 17, wherein the program code further comprises the programming instructions for:
translating said pseudo Doppler shift to said actual Doppler shift within a time window based on a change in said pseudo Doppler shift within said time window.

20. The computer program product as recited in claim 17, wherein the program code further comprises the programming instructions for:
selecting one or more peak frequencies in said frequency domain of said fast Fourier transformed mixed audio signals based on their magnitude and said estimated velocity of said object.

21. The computer program product as recited in claim 15, wherein the program code further comprises the programming instructions for:
estimating an initial position of said object using said estimated distance from said speaker of said controlled device to said microphone of said controlled device via said object; and
computing coordinates of said object using said estimated distance from said speaker of said controlled device to said microphone of said controlled device via said object, said estimated velocity of said object and said initial position of said object.

22. The computer program product as recited in claim 21, wherein an initial distance of said object is estimated by filtering out spectral points, selecting a peak out of the remaining peaks based on their amplitude and/or consistency with said estimated velocity of said object estimated from an actual Doppler shift, rounding said selected peak to the closest spectral points to form a rounded frequency, and converting said rounded frequency to said initial distance estimate of said object.

23. The computer program product as recited in claim 15, wherein the program code further comprises the programming instructions for:
estimating a distance between said speaker and said microphone of said controlled device;
estimating a distance between speakers of said controlled device using said distance between said speaker and said microphone of said controlled device; and
computing coordinates of said object using said estimated distance from said speaker of said controlled device to said microphone of said controlled device via said object, said estimated velocity of said object, said estimated distance between said speakers of said controlled device and an estimated distance between said speakers and microphones of said controlled device.

24. The computer program product as recited in claim 15, wherein the program code further comprises the programming instructions for:
detecting an initial gesture; and
estimating an initial position of said object in response to detecting said initial gesture.

25. The computer program product as recited in claim 24, wherein the program code further comprises the programming instructions for:
detecting said initial gesture by collecting positive traces of said fast Fourier transformed mixed audio signals while a user is performing said initial gesture and collecting negative traces of said fast Fourier transformed mixed audio signals while said user is not performing said initial gesture; and
matching recently received fast Fourier transformed mixed audio signals against said positive or negative traces using a pattern matching algorithm to detect said initial gesture.

26. The computer program product as recited in claim 15, wherein the program code further comprises the programming instructions for:
filtering out a reflection from static objects.

27. A controlled device, comprising:
a memory for storing a computer program for tracking movement of an object; and
a processor coupled to the memory, wherein the processor is configured to execute the program instructions of the computer program comprising:
transmitting audio signals from one or more speakers to said object;
receiving samples of said audio signals reflected from said object over a period of time;
mixing said received audio signals with said transmitted audio signals;
performing a fast Fourier transform on said mixed audio signals;
selecting one or more peak frequencies in a frequency domain of said fast Fourier transformed mixed audio signals;
estimating a velocity of said object; and
estimating a distance from a speaker of said controlled device to a microphone of said controlled device via said object based on said selected one or more peak frequencies and velocity of said object.

28. The controlled device as recited in claim 27, wherein the program instructions of the computer program further comprise:
estimating coordinates of said object using said estimated distance from said speaker of said controlled device to said microphone of said controlled device via said object, said estimated velocity of said object, estimated distances between all speakers of said controlled device and an estimated distance between each pair of said speakers and microphones of said controlled device.

29. The controlled device as recited in claim 27, wherein the program instructions of the computer program further comprise:
estimating a pseudo Doppler shift in said frequency domain of said fast Fourier transformed mixed audio signals, wherein said pseudo Doppler shift is a difference between a current peak frequency versus a closest spectral point below said current peak frequency in said fast Fourier transformed mixed audio signals; and
translating said pseudo Doppler shift to an actual Doppler shift to estimate said velocity of said object.

30. The controlled device as recited in claim 29, wherein the program instructions of the computer program further comprise:
detecting peak frequencies in said fast Fourier transformed mixed audio signals;
filtering peak frequencies at spectral points;
selecting peak frequencies from remaining unfiltered peak frequencies;
estimating a pseudo Doppler shift for each of the selected peak frequencies; and combining said estimated pseudo Doppler shifts to derive a final pseudo Doppler shift.

31. The controlled device as recited in claim 29, wherein the program instructions of the computer program further comprise:

translating said pseudo Doppler shift to said actual Doppler shift within a time window based on a change in said pseudo Doppler shift within said time window.

32. The controlled device as recited in claim 29, wherein the program instructions of the computer program further comprise:

selecting one or more peak frequencies in said frequency domain of said fast Fourier transformed mixed audio signals based on their magnitude and said estimated velocity of said object.

33. The controlled device as recited in claim 27, wherein the program instructions of the computer program further comprise:

estimating an initial position of said object using said estimated distance from said speaker of said controlled device to said microphone of said controlled device via said object; and computing coordinates of said object using said estimated distance from said speaker of said controlled device to said microphone of said controlled device via said object, said estimated velocity of said object and said initial position of said object.

34. The controlled device as recited in claim 33, wherein an initial distance of said object is estimated by filtering out spectral points, selecting a peak out of the remaining peaks based on their amplitude and/or consistency with said estimated velocity of said object estimated from an actual Doppler shift, rounding said selected peak to the closest spectral points to form a rounded frequency, and converting said rounded frequency to said initial distance estimate of said object.

35. The controlled device as recited in claim 27, wherein the program instructions of the computer program further comprise:

estimating a distance between said speaker and said microphone of said controlled device;

estimating a distance between speakers of said controlled device using said distance between said speaker and said microphone of said controlled device; and computing coordinates of said object using said estimated distance from said speaker of said controlled device to said microphone of said controlled device via said object, said estimated velocity of said object, said estimated distance between said speakers of said controlled device and an estimated distance between said speakers and microphones of said controlled device.

36. The controlled device as recited in claim 27, wherein the program instructions of the computer program further comprise:

detecting an initial gesture; and estimating an initial position of said object in response to detecting said initial gesture.

37. The controlled device as recited in claim 36, wherein the program instructions of the computer program further comprise:

detecting said initial gesture by collecting positive traces of said fast Fourier transformed mixed audio signals while a user is performing said initial gesture and collecting negative traces of said fast Fourier transformed mixed audio signals while said user is not performing said initial gesture; and matching recently received fast Fourier transformed mixed audio signals against said positive or negative traces using a pattern matching algorithm to detect said initial gesture.

38. The controlled device as recited in claim 27, wherein the program instructions of the computer program further comprise:

filtering out a reflection from static objects.

* * * * *